Patented Nov. 12, 1935

2,020,769

UNITED STATES PATENT OFFICE 2,020,769

PROCESS FOR THE MANUFACTURE OF BORNYL OXALATES

Etienne Darrasse, Paris, and Lucien Dupont, Vincennes, France, assignors of one-half to Leon Darrasse, Paris, France, and Egon Elod, Carlsruhe, Germany No Drawing. Application February 28, 1933, Serial No. 659,022. In Germany February 29, 1932

2 Claims. (Cl. 260—99)

Various processes are already known for the manufacture of bornyl oxalate commencing with essence of turpentine and oxalic acid. For example, it has been proposed to cause the anhydrous oxalic acid to act on the essence of turpentine in the presence of tetrachloride of carbon with aluminum chloride as the condensation catalyst, at 70° C. It has likewise been proposed to effect the reaction between the essence of turpentine and the anhydrous oxalic acid in the presence of organic solvents whether chlorinated or not, such for example as tetrachlorethane, trichlorethylene and the like, benzol, toluol and the like, these various solvents being used alone or in combination.

All these known methods for the production of bornyl oxalates have objections, or else give bad yields, or else necessitate the use of costly solvents which are difficult to recover. Thus, in working in the presence of aluminium chloride it is only possible to transform about 38% of the pinene or essence of turpentine; the portion of this product which is not transformed is practically wasted.

When use is made of organic solvents of the kind above indicated, at a temperature of 110°–120° C., the proportion of pinene transformed into bornyl oxalate is higher; it reaches as much as 60%; nevertheless the use and recovery of the solvents are relatively costly because of certain precautions which it is necessary to take, which render the process relatively dear and complicated and reduces the value thereof from the economical standpoint.

If anhydrous oxalic acid and turpentine, alone, are reacted, generally an unsatisfactory yield is had, at the most 40% with respect to the pinene used, but it has been observed that with direct reaction without solvents, it is possible to obtain as a yield, approximately 60% and more of the pinene used, and to recover that portion remaining untransformed. However, to obtain such results, it has been found necessary to conduct these reactions at a temperature of approximately 110° to 125° C., continuously agitate the reaction mixture, and completely eliminate water traces from the reaction field.

The agitation of the mixture and the elimination of the oxygen can, in case of need, be effected at the same time, by causing to pass through the mixture a current of gases or vapors of suitable nature which do not comprise, or containing very little, oxygen and which do not hold water, like nitrogen, carbon dioxide, benzol vapor and so on. The turbulence of the gaseous current can be maintained mechanically, for example, by means of an agitator. This current can also be introduced and divided by an agitating apparatus formed for example by a rotating bent tube.

Finally one can carry out the operation by effecting it at a reduced pressure which has the advantage of being able to dispense in case of need with the use of other special arrangements for eliminating the water and oxygen and so simplify to a notable extent the process and apparatus therefor.

The transformation desired requires, in order to be carried out according to the present process, about 6 to 8 hours. After this time, the mixture contains, in addition to the esters of the borneols (borneol and isoborneol) volatile turpentine bodies consisting of a portion of the pinene which has not entered into the combination or have been formed by isomerization of this product.

Means known in organic chemistry permit of readily separating these different bodies and the esters of the borneols are, by saponification easily transformed into corresponding borneols.

Example I

There is placed in an agitating apparatus through which passes a strong current of carbon dioxide:

1 kg. pinene.

350 grs. carefully pulverized anhydrous oxalic acid.

Heat for 8 hours at 115° C. The part of the mixture thus obtained of oxalates of borneal, of primary unchanged material and of terpene products, formed by isomerization, represents in bornyl oxalates about 60% of the quantity of essence of turpentine used.

After the preparatory work of the mixture and the saponification of the bornyl esters, there is obtained a mixture of borneol and isoborneol. In these conditions, it is, as stated, about 60% of the pinene which has been transformed in this mixture and the remainder, approximately 40% can be used for various purposes where the essence of turpentine is employed.

Example II 1 kg. rectified turpentine was treated at 118° C. for 8 hours with 500 grs. anhydrous oxalic acid finally pulverized in a receptacle through which was passed a strong current of nitrogen; the outlet tube had its extremity bent at right angles and had a slow movement beneath the surface of the liquid.

After manipulation of the mixture and saponification of the isolated bornyl oxalates there was obtained a mixture of borneol and isoborneol corresponding to a yield of 50% of the original essence of turpentine.

*Example III*

1 kg. rectified turpentine was treated at 120° C. for 7 hours with 350 grs. of finely pulverized oxalic acid in a receptacle provided with a mechanical agitator; the receptacle had been filled with carbon dioxide. The yield of borneol and isoborneol reached 55% of the original essence of turpentine.

What we claim, is:

1. A process for the manufacture of bornyl oxalates by the action of anhydrous oxalic acid on essence of turpentine without the presence of a solvent or condensing agent, comprising conducting the reaction under continuous agitation at temperatures of about 110°–125° C., and eliminating the reaction water from the liberated vapors by carrying out the operation in the absence of oxygen in an atmosphere of inert gas having no action on the pinene.

2. A process for the manufacture of bornyl oxalates by the action of anhydrous oxalic acid on essence of turpentine without the presence of a solvent or condensing agent, comprising conducting the reaction under continuous agitation at temperatures of about 110°–125° C., eliminating the reaction water from the liberated vapors, and simultaneously with the elimination of the reaction water inducing the movement of the reaction mixture and the elimination of oxygen from the reaction vessel by the passage through the mixture of a current of anhydrous inert gases or vapors free from oxygen.

ETIENNE DARRASSE.
LUCIEN DUPONT.